(12) United States Patent
Igarashi

(10) Patent No.: US 8,225,814 B2
(45) Date of Patent: Jul. 24, 2012

(54) DIFFERENTIAL-PRESSURE FLOWMETER AND FLOW-RATE CONTROLLER

(75) Inventor: Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 381 days.

(21) Appl. No.: 12/695,189

(22) Filed: Jan. 28, 2010

(65) Prior Publication Data

US 2010/0193051 A1    Aug. 5, 2010

(30) Foreign Application Priority Data

Feb. 5, 2009 (JP) ................................ 2009-024714

(51) Int. Cl.
*F16K 31/12*      (2006.01)
(52) U.S. Cl. ............... 137/487.5; 137/485; 137/338; 73/861.42; 73/861.52; 73/861.68; 73/861.61; 73/708
(58) Field of Classification Search ............... 137/487.5, 137/488, 487, 486, 338; 73/861.42, 861.47, 73/861.52, 861.61, 861.68, 708
See application file for complete search history.

(56) References Cited

U.S. PATENT DOCUMENTS

| | | | |
|---|---|---|---|
| 4,240,294 A | 12/1980 | Grande | |
| 5,524,084 A | 6/1996 | Wang et al. | |
| 5,672,832 A * | 9/1997 | Cucci et al. | 73/861.52 |
| 6,539,968 B1 * | 4/2003 | White et al. | 137/10 |
| 6,578,435 B2 * | 6/2003 | Gould et al. | 73/861.52 |
| 6,843,139 B2 * | 1/2005 | Schumacher et al. | 73/861.52 |
| 7,866,337 B2 * | 1/2011 | Chinnock et al. | 137/487.5 |
| 7,942,069 B2 * | 5/2011 | Peterson | 73/861.52 |
| 8,006,572 B2 * | 8/2011 | Igarashi | 73/861.61 |
| 8,015,995 B2 * | 9/2011 | Brodeur et al. | 137/487.5 |
| 8,091,436 B2 * | 1/2012 | Eckhardt et al. | 73/861.52 |
| 2003/0234039 A1 * | 12/2003 | Shajii et al. | 137/12 |
| 2004/0177703 A1 * | 9/2004 | Schumacher et al. | 73/861.52 |
| 2005/0189018 A1 * | 9/2005 | Brodeur et al. | 137/487.5 |
| 2006/0008328 A1 | 1/2006 | Morgan et al. | |
| 2006/0123892 A1 * | 6/2006 | Brekelmans et al. | 73/61.76 |
| 2006/0236781 A1 * | 10/2006 | Ohmi et al. | 73/861.52 |
| 2007/0044843 A1 * | 3/2007 | Nugent et al. | 137/487.5 |
| 2007/0089788 A1 * | 4/2007 | Chinnock et al. | 137/487.5 |
| 2009/0229377 A1 * | 9/2009 | Ushigusa et al. | 73/861.61 |

FOREIGN PATENT DOCUMENTS

| | | |
|---|---|---|
| EP | 1944583 A1 | 7/2008 |
| JP | 2009-2901 A | 1/2009 |

* cited by examiner

*Primary Examiner* — John Rivell
*Assistant Examiner* — Minh Le
(74) *Attorney, Agent, or Firm* — Muncy, Geissler, Olds & Lowe, PLLC

(57) ABSTRACT

A differential-pressure flowmeter that can reduce (eliminate) a difference between the ambient temperature of one pressure sensor and the ambient temperature of another pressure sensor so as to allow for accurate and stable pressure measurement is provided, and a flow-rate controller equipped with such a differential-pressure flowmeter is provided. Provided are a body having a main fluid channel through which a fluid, whose pressure is to be measured, flows, and two pressure sensors held by the body and arranged in series relative to the main fluid channel, and a temperature balancer composed of a material with high thermal conductivity is accommodated in a recess that is formed in the body located below the two pressure sensors.

7 Claims, 5 Drawing Sheets

DIFFERENTIAL-PRESSURE FLOWMETER AND FLOW-RATE CONTROLLER

BACKGROUND OF THE INVENTION

1. Field of the Invention

The present invention relates to differential-pressure flowmeters and flow-rate controllers used in fluid transport pipes in various industrial fields, such as chemical factories, semiconductor manufacturing, food manufacturing, and biotechnology.

This application is based on Japanese Patent Application No. 2009-024714, the content of which is incorporated herein by reference.

2. Description of Related Art

Japanese Unexamined Patent Application, Publication No. 2009-2901 discloses a known example of a differential-pressure flowmeter and a flow-rate controller used in fluid transport pipes in various industrial fields, such as chemical factories, semiconductor manufacturing, food manufacturing, and biotechnology.

Two pressure sensors constituting the differential-pressure flowmeter and the flow-rate controller disclosed in Japanese Unexamined Patent Application, Publication No. 2009-2901 each have a characteristic such that an indication value changes as the ambient temperature (surrounding temperature) changes; that is, the indication value increases as the ambient temperature becomes higher.

Therefore, when a temperature difference occurs between the ambient temperature of one of the pressure sensors and the ambient temperature of the other pressure sensor as a result of a change in the ambient temperature of only the one pressure sensor, the pressure measurement by the pressure sensors becomes unstable, possibly causing a malfunction.

BRIEF SUMMARY OF THE INVENTION

The present invention has been made in view of these circumstances, and an object thereof is to provide a differential-pressure flowmeter that can reduce (eliminate) the difference between the ambient temperature of one pressure sensor and the ambient temperature of another pressure sensor so as to allow for accurate and stable pressure measurement, and to provide a flow-rate controller equipped with such a differential-pressure flowmeter.

In order to achieve the aforementioned object, the present invention provides the following solutions.

A differential-pressure flowmeter according to a first aspect of the present invention includes a body having a main fluid channel through which a fluid, whose pressure is to be measured, flows, and two pressure sensors held by the body and arranged in series relative to the main fluid channel, and a temperature balancer composed of a material with high thermal conductivity is accommodated in a recess that is formed in the body located below the two pressure sensors.

With the differential-pressure flowmeter according to the first aspect of the present invention, since the temperature balancer composed of a material with high thermal conductivity (e.g., aluminum alloy A5052) is embedded (fitted) in the body located below the two pressure sensors, a difference between the ambient temperature of one of the pressure sensors and the ambient temperature of the other pressure sensor can be reduced (eliminated), thereby allowing for accurate and stable pressure measurement.

A flow-rate controller according to a second aspect of the present invention includes a differential-pressure flowmeter that can reduce (eliminate) a difference between the ambient temperature of one pressure sensor and the ambient temperature of another pressure sensor so as to allow for accurate and stable pressure measurement.

With the flow-rate controller according to the second aspect of the present invention, the accuracy and stability of a measured flow-rate value (measured flow rate) are enhanced, whereby the accuracy in fluid flow-rate control of the measured flow rate of the fluid flowing through the main fluid channel can be enhanced.

In a flow-rate controller according to a third aspect of the present invention, a body located below a motor that vertically moves a valve plug of a flow-rate control valve and a control board that controls the degree of opening of the flow-rate control valve is connected to a body located below two pressure sensors via a constricted section formed so as to have a width smaller than that of the body located below the two pressure sensors and a height smaller than that of the body located below the two pressure sensors.

With the flow-rate controller according to the third aspect of the present invention, since the body located below the two pressure sensors and the body located below the control board and the motor serving as a heat source are connected to each other via the constricted section, heat transmission from the body located below the control board and the motor serving as a heat source to the body located below the two pressure sensors can be minimized, whereby a difference between the ambient temperature of one of the pressure sensors and the ambient temperature of the other pressure sensor can be reduced (eliminated), and the accuracy in fluid flow-rate control of the measured flow rate of the fluid flowing through the main fluid channel can be further enhanced.

The aforementioned flow-rate controller preferably includes base components disposed between the bodies and an installation surface and fixed to the bodies with fastening members, and a base component positioned between a base component located below the two pressure sensors and a base component located below the motor and the control board is preferably provided with at least one slit that extends therethrough in a thickness direction thereof.

With such a flow-rate controller, since at least one (e.g., seven) slit is formed in the base component positioned between the base component located below the two pressure sensors and the base component located below the control board and the motor serving as a heat source, heat transmission from the base component located below the control board and the motor serving as a heat source to the base component located below the two pressure sensors can be minimized, whereby a difference between the ambient temperature of one of the pressure sensors and the ambient temperature of the other pressure sensor can be reduced (eliminated), and the accuracy in fluid flow-rate control of the measured flow rate of the fluid flowing through the main fluid channel can be further enhanced.

In the aforementioned flow-rate controller, it is more preferable that at least one cooling groove that allows a front surface and a rear surface to communicate with each other be formed in an upper surface of the base component located below the motor and the control board.

With such a flow-rate controller, since at least one (e.g., two) cooling groove is formed in the upper surface of the base component located below the control board and the motor serving as a heat source and the heat in the body and the base component located below the control board and the motor serving as a heat source is carried away by the air passing through the cooling groove, heat transmission from the body and the base component located below the control board and the motor serving as a heat source to the body and the base component located below the two pressure sensors can be minimized, whereby a difference between the ambient temperature of one of the pressure sensors and the ambient temperature of the other pressure sensor can be reduced (eliminated), and the accuracy in fluid flow-rate control of the measured flow rate of the fluid flowing through the main fluid channel can be further enhanced.

In the aforementioned flow-rate controller, it is more preferable that at least one groove that allows a front surface and a rear surface to communicate with each other be formed in a lower surface of the base component located below the motor and the control board.

With such a flow-rate controller, since at least one (e.g., one) groove is formed in the lower surface of the base component located below the control board and the motor serving as a heat source, the heat from an installation surface can be prevented from entering the base components, whereby a difference between the ambient temperature of one of the pressure sensors and the ambient temperature of the other pressure sensor can be reduced (eliminated), and the accuracy in fluid flow-rate control of the measured flow rate of the fluid flowing through the main fluid channel can be further enhanced.

In the aforementioned flow-rate controller, it is more preferable that at least one groove that allows a front surface and a rear surface to communicate with each other be formed in a lower surface of the base component located below the two pressure sensors.

According to such a flow-rate controller, since at least one (e.g., one) groove is formed in the lower surface of the base component located below the two pressure sensors, the heat from the installation surface can be prevented from entering the base components, whereby a difference between the ambient temperature of one of the pressure sensors and the ambient temperature of the other pressure sensor can be reduced (eliminated), and the accuracy in fluid flow-rate control of the measured flow rate of the fluid flowing through the main fluid channel can be further enhanced.

With the differential-pressure flowmeter according to the present invention, a difference between the ambient temperature of one of the pressure sensors and the ambient temperature of the other pressure sensor can be reduced (eliminated), thereby advantageously allowing for accurate and stable pressure measurement.

With the flow-rate controller that controls the degree of opening of the flow-rate control valve by using a measured value of the differential-pressure flowmeter according to the present invention, the accuracy and stability of a measured flow-rate value (measured flow rate) are enhanced, whereby the accuracy in fluid flow-rate control of the measured flow rate of the fluid flowing through the main fluid channel can advantageously be enhanced.

DETAILED DESCRIPTION OF THE INVENTION

A differential-pressure flowmeter and a flow-rate controller according to an embodiment of the present invention will be described below with reference to FIGS. 1 to 5C.

Figure 1:
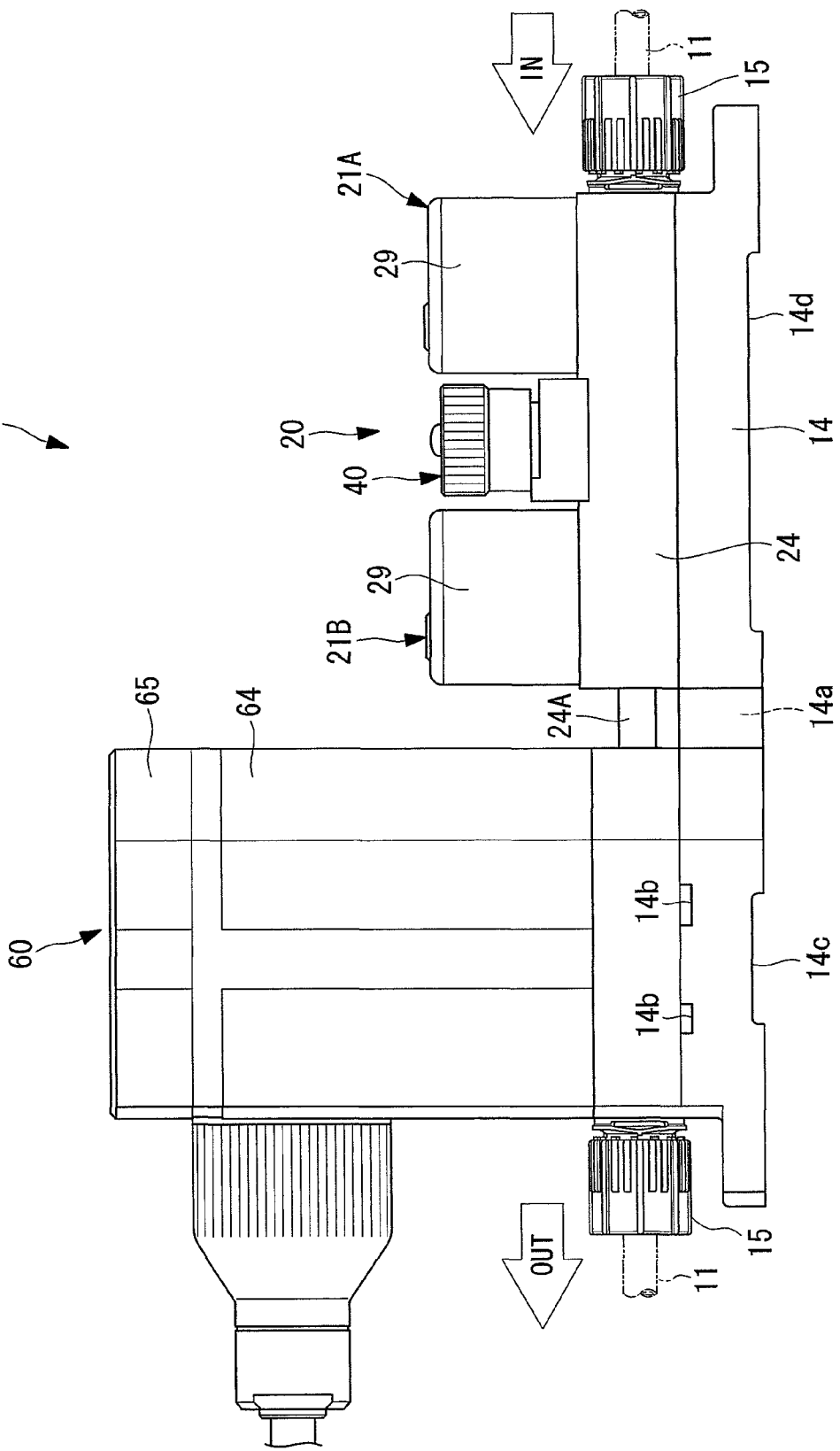
FIG. 1 is a front view of a flow-rate controller according to an embodiment of the present invention.
Figure 2:
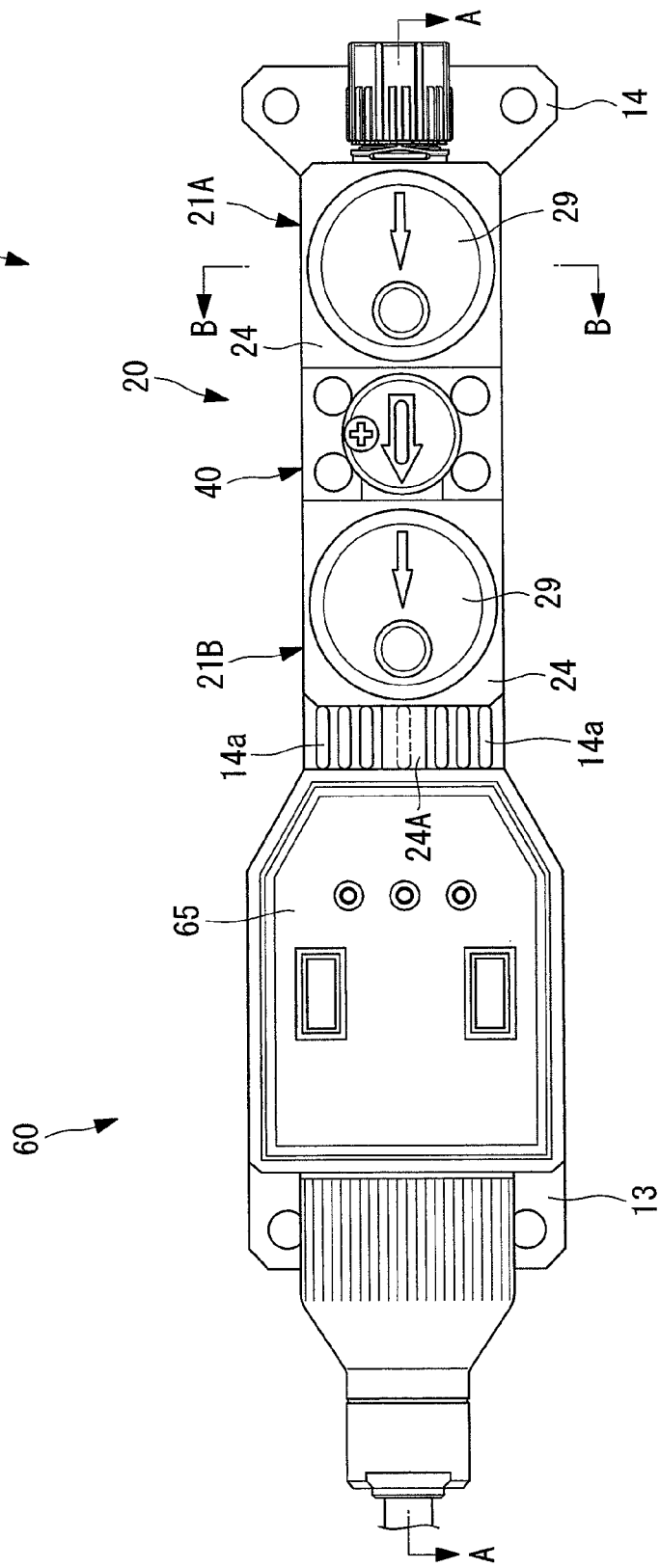
FIG. 2 is a plan view of FIG. 1.
Figure 3:
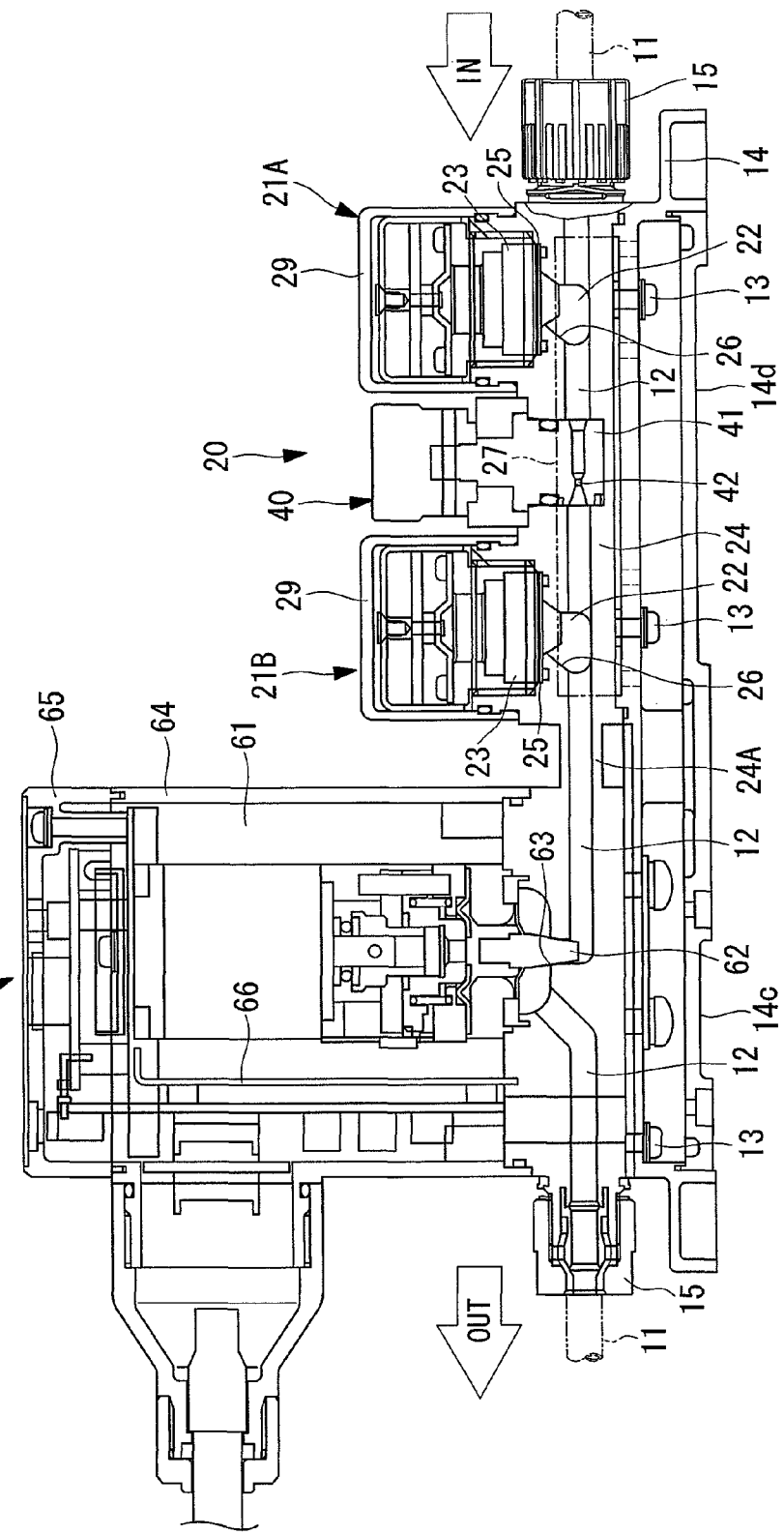
FIG. 3 is a sectional view taken along line A-A in FIG. 2.
Figure 4:
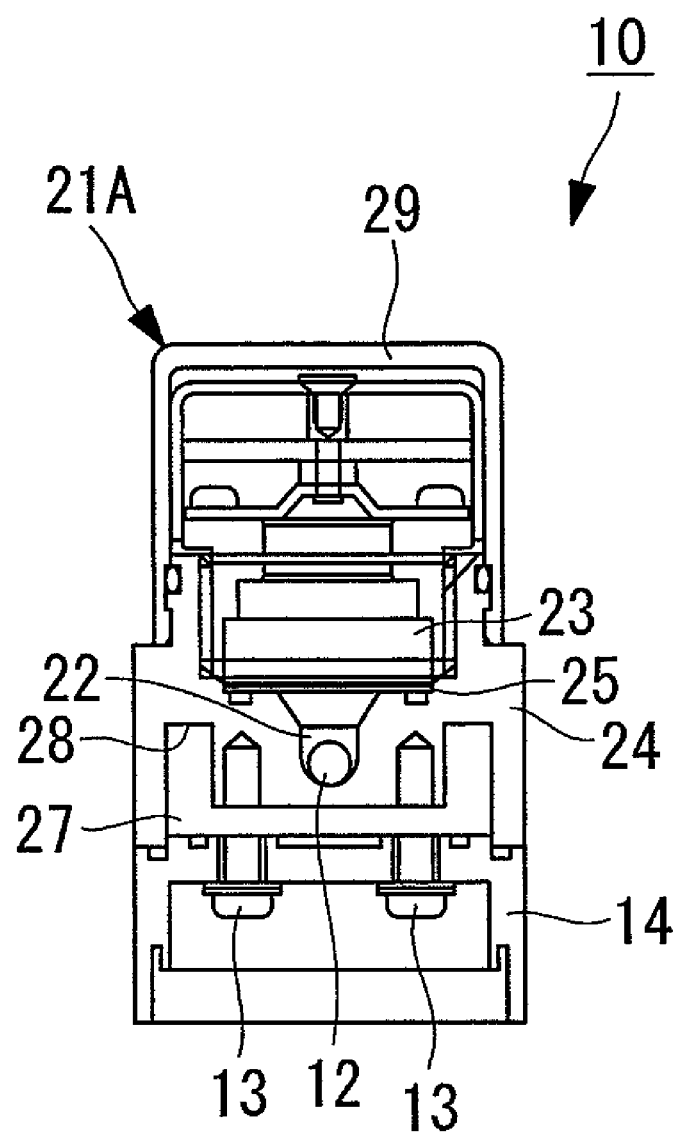
FIG. 4 is a sectional view taken along line B-B in FIG. 2.
Figure 5C:
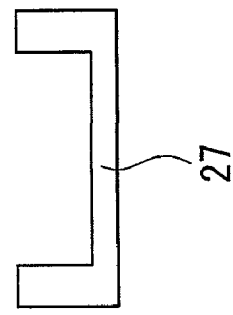
FIG. 5C is a side view illustrating the temperature balancer incorporated in the differential-pressure flowmeter according to the embodiment of the present invention.
Figure 5A:
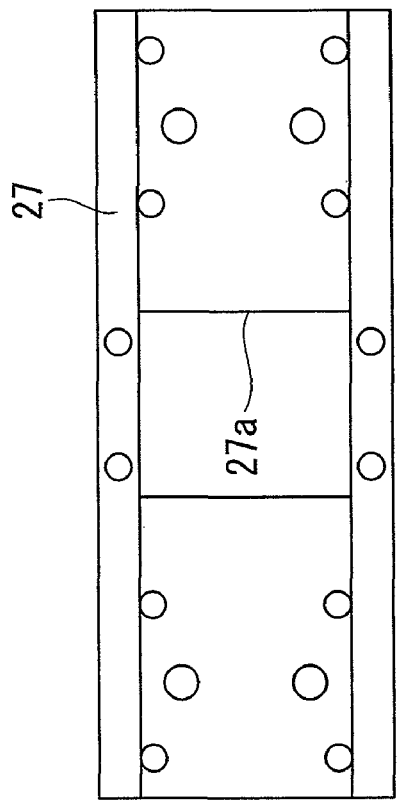
FIG. 5A is a plan view illustrating a temperature balancer incorporated in a differential-pressure flowmeter according to an embodiment of the present invention.
Figure 5B:
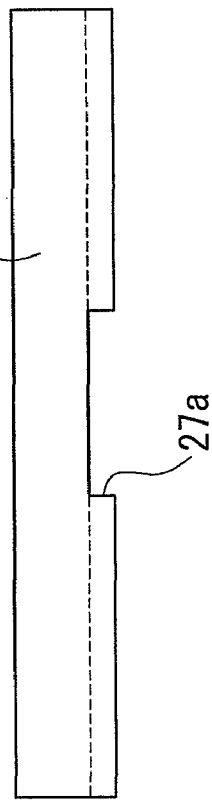
FIG. 5B is a front view illustrating the temperature balancer incorporated in the differential-pressure flowmeter according to the embodiment of the present invention.

FIG. 1 is a front view of the flow-rate controller according to this embodiment. FIG. 2 is a plan view of FIG. 1. FIG. 3 is a sectional view taken along line A-A in FIG. 2. FIG. 4 is a sectional view taken along line B-B in FIG. 2. FIG. 5A is a plan view illustrating a temperature balancer incorporated in the differential-pressure flowmeter according to this embodiment. FIG. 5B is a front view of the temperature balancer. FIG. 5C is a side view of the temperature balancer.

A flow-rate controller 10 is a flow-rate controlling device that is incorporated in a pipe 11 communicating with a main fluid channel 12, to be described later, and keeps the fluid flow rate of a liquid (such as a chemical solution) flowing through the main fluid channel 12 constant. The flow-rate controller 10 mainly includes a differential-pressure flowmeter 20 for measuring an actual fluid flow rate and a flow-rate control valve 60 capable of controlling the degree of opening of a valve plug.

The differential-pressure flowmeter 20 is disposed on the upstream side of the flow-rate control valve 60, as viewed in the direction of flow of the fluid flowing through the main fluid channel 12.

The differential-pressure flowmeter 20 is configured such that a pair of pressure sensors 21A and 21B are arranged in series with an orifice unit 40 therebetween. Specifically, in the differential-pressure flowmeter 20, pressure values of the fluid creating a pressure difference as a result of passing through the orifice unit 40 are individually detected by the two pressure sensors 21A and 21B, and these two pressure values are converted to electrical signals which are then input to a control unit (not shown). The control unit receiving the input signals of the pressure values can measure the flow rate of the fluid flowing through the main fluid channel 12 by converting a differential pressure obtained from the two pressure values to a flow rate. In the description below, the pressure sensor 21A disposed on the upstream side relative to the orifice unit 40 will be referred to as "first sensor" and the pressure sensor 21B disposed on the downstream side will be referred to as "second sensor" so as to distinguish the two pressure sensors from each other.

Since the first sensor 21A and the second sensor 21B basically have the same configuration, the following description will be directed to the first sensor 21A disposed on the upstream side.

As shown in FIG. 3, the first sensor 21A includes, for example, a sensor body (pressure detecting section) 23 disposed in a pressure introduction channel 22 that branches off upward in a T-shape from the main fluid channel 12 through which the fluid, whose pressure is to be measured, flows. In this embodiment, the pressure introduction channel 22 that communicates with a sensor accommodation space 25 located thereabove is provided substantially orthogonal to the main fluid channel 12 extending through a body 24. The pressure introduction channel 22 has an inclined surface 26 at a wall surface thereof on the downstream side as viewed in the direction of flow of the fluid. The inclined surface 26 is inclined in a direction that widens the opening area at the fluid entrance side. This inclined surface 26 provides a slope on a sidewall surface of the pressure introduction channel 22 by forming a downstream half thereof in a substantially truncated cone shape, and the pressure introduction channel 22 is configured such that the channel sectional area at the lower side, which is the fluid entrance side communicating with the main fluid channel 12, is larger than that at the fluid exit side communicating with the sensor accommodation space 25.

The sensor body 23 is not limited in particular so long as it can detect the fluid pressure, but is preferably, for example, a piezoelectric-type pressure sensor, a capacitance-type pressure sensor, or a strain-gauge-type pressure sensor. In this embodiment, a strain-gauge-type pressure sensor is used as the sensor body 23.

The body 24 is integrally formed by using, for example, polytetrafluoroethylene (PTFE). A recess 28 (see FIG. 4) that accommodates a temperature balancer 27 shown in FIG. 5 is formed in a lower surface of the body 24 located below the first sensor 21A and the second sensor 21B.

As shown in FIGS. 5A to 5C, the temperature balancer 27 is a thin-plate-like component with a rectangular shape in plan view and an angular U-shape in side view, and is integrally formed by using, for example, aluminum alloy A5052. A through-hole 27a that is rectangular in plan view is formed in the middle of the temperature balancer 27.

The body 24 located below the first sensor 21A and the second sensor 21B and a body 24 located below a motor 61 and a control board 66, to be described later, are connected to each other via a connecting section (constricted section) 24A formed so as to have a width (i.e., length in the vertical direction in FIG. 2) smaller than that of the body 24 located below the first sensor 21A and the second sensor 21B and a height (i.e., length in the vertical direction in FIGS. 1 and 3) smaller than that of the body 24 located below the first sensor 21A and the second sensor 21B. The main fluid channel 12 is formed within this connecting section 24A.

A cover 29 is attached to an upper section of the body 24 so as to cover associated components of the sensor body 23. The body 24 is firmly supported above a base component 14 with fastening members, such as screws 13, and the body 24 is joined (connected) to the pipe 11, which communicates with the main fluid channel 12, by using cap nuts 15 having a joint structure.

The base component 14 is integrally formed by using, for example, polypropylene (PP). As shown in FIG. 2, the base component 14 positioned between the base component 14 located below the first sensor 21A and the second sensor 21B and the base component 14 located below the motor 61 and the control board 66, to be described later, is provided with one or more (seven in this embodiment) slits 14a arrayed in the width direction (i.e., the vertical direction in FIG. 2). The slits 14a are through-holes extending through the aforementioned base component 14 in the thickness direction thereof and are formed in the shape of an elongate hole in the longitudinal direction (i.e., the horizontal direction in FIG. 2).

As shown in FIG. 1, one or more (two in this embodiment) cooling grooves (first grooves) 14b arranged in the longitudinal direction (i.e., the horizontal direction in FIG. 1) are formed in an upper surface of the base component 14 located below the motor 61 and the control board 66, to be described later. The cooling grooves 14b are rectangular in front view and allow the front and rear surfaces to communicate with each other, and are formed along the width direction (i.e., a direction orthogonal to the plane of the drawing in FIG. 1).

On the other hand, as shown in FIGS. 1 and 3, at least one (one in this embodiment) groove (second groove) 14c is formed along the width direction (i.e., the direction orthogonal to the plane of the drawing in FIGS. 1 and 3) in a lower surface of the base component 14 located below the motor 61 and the control board 66, to be described later. The groove 14c is rectangular in front view and allows the front and rear surfaces to communicate with each other.

Furthermore, as shown in FIGS. 1 and 3, at least one (one in this embodiment) groove (third groove) 14d is formed along the width direction (i.e., the direction orthogonal to the plane of the drawing in FIGS. 1 and 3) in a lower surface of the base component 14 located below the first sensor 21A and the second sensor 21B. The groove 14d is rectangular in front view and allows the front and rear surfaces to communicate with each other.

The orifice unit 40 includes an orifice body 41 disposed between the first sensor 21A and the second sensor 21B. This orifice body 41 is provided with an orifice channel 42 having a channel sectional area smaller than that of the main fluid channel 12 formed in the body 24 of the first sensor 21A and the second sensor 21B. In the example shown in the drawings, the channel sectional area decreases in a stepwise manner from the main fluid channel 12 to the orifice channel 42 with the minimum diameter.

One end (i.e., the lower end in FIG. 3) of the orifice body 41 that has the orifice channel 42 extends into the body 24.

In the main fluid channel 12 at the downstream side of the second sensor 21B, the flow-rate control valve 60 is disposed in the body 24 used in common with the first sensor 21A and the second sensor 21B. The flow-rate control valve 60 is configured to control the degree of opening so that a difference between a measured flow-rate value of the differential-pressure flowmeter 20 and a preliminarily set flow rate is within a predetermined range.

The flow-rate control valve 60 has a configuration that opens and closes a needle (valve plug) 62 by vertically moving the needle 62 using a driving mechanism equipped with the motor 61, such as a stepping motor, so as to set the needle 62 in a desired opening position relative to a valve seat 63. However, regarding the flow-rate control valve 60, the driving mechanism and the valve-plug mechanism thereof are not limited in particular so long as the degree of opening of the needle 62 can be adjusted.

Reference numeral 64 in the drawings denotes a cover that covers the motor 61 and the like, 65 denotes a lid that covers an opening formed at one end (i.e., the upper end in FIG. 3) of the cover 64, and 66 denotes a control board.

Prior to commencing operation, the flow-rate controller 10 having the above configuration inputs and stores, in the control unit, a desired fluid flow rate (referred to as "set flow rate" hereinafter) Qr to be kept constant. The control unit operates the needle 62 of the flow-rate control valve 60 so as to set an initial degree of opening thereof to a degree of valve opening corresponding to the input set flow rate Qr. When a fluid is made to flow through the flow-rate controller 10, since the differential-pressure flowmeter 20 measures a flow rate (referred to as "measured flow rate" hereinafter) Qf of the actually flowing fluid and inputs the measured flow rate Qf to the control unit, the control unit calculates therein a flow-rate difference $\Delta Q$ ($\Delta Q = Qr - Qf$) between the measured flow rate Qf and the set flow rate Qr and performs a comparison.

The aforementioned flow-rate difference $\Delta Q$ is compared with a preliminarily set allowable range q. When the absolute value of the flow-rate difference $\Delta Q$ is smaller than the allowable range q ($\Delta Q < q$), it is determined that the fluid is flowing at the desired set flow rate Qr, and the flow-rate control valve 60 is maintained at the initial degree of opening.

On the other hand, when the aforementioned flow-rate difference $\Delta Q$ is a positive value (Qr>Qf) and the absolute value of the flow-rate difference $\Delta Q$ is larger than or equal to the allowable range q ($\Delta Q \geq q$), it can be determined that the fluid is in a low flow-rate state where the measured flow rate Qf does not satisfy the desired set flow rate Qr. Therefore, in order to increase the measured flow rate Qf, the needle 62 of the flow-rate control valve 60 is moved in a direction for increasing the degree of opening from the initial degree of opening.

When the aforementioned flow-rate difference ΔQ is a negative value (Qr<Qf) and the absolute value of the flow-rate difference ΔQ is larger than or equal to the allowable range q (ΔQ≧q), it can be determined that the fluid is in a high flow-rate state where the measured flow rate Qf does not satisfy the desired set flow rate Qr. Therefore, in order to decrease the measured flow rate Qf, the needle 62 of the flow-rate control valve 60 is moved in a direction for reducing the degree of opening from the initial degree of opening.

In this manner, the flow-rate controller 10 performs feedback control so that the absolute value of the flow-rate difference ΔQ obtained by a comparison with the set flow rate Qr on the basis of the measured flow rate Qf input from the differential-pressure flowmeter 20 satisfies the predetermined allowable range, whereby the flow rate of the fluid flowing through the main fluid channel 12 can be kept constant.

With the differential-pressure flowmeter 20 according to this embodiment, since the temperature balancer 27 composed of a material with high thermal conductivity (aluminum alloy A5052 in this embodiment) is embedded (fitted) in the body 24 located below the first sensor 21A and the second sensor 21B, a difference between the ambient temperature of the first sensor 21A and the ambient temperature of the second sensor 21B can be reduced (eliminated), thereby allowing for accurate and stable pressure measurement.

Furthermore, with the flow-rate controller 10 that controls the degree of opening of the flow-rate control valve 60 by using a measured value of the differential-pressure flowmeter 20 according to this embodiment, the accuracy and stability of a measured flow-rate value (measured flow rate Qf) are enhanced, whereby the accuracy in fluid flow-rate control of the measured flow rate Qf of the fluid flowing through the main fluid channel 12 can be enhanced.

With the flow-rate controller 10 according to this embodiment, since the body 24 located below the first sensor 21A and the second sensor 21B and the body 24 located below the control board 66 and the motor 61 serving as a heat source are connected to each other via the connecting section 24A, heat transmission from the body 24 located below the control board 66 and the motor 61 serving as a heat source to the body 24 located below the first sensor 21A and the second sensor 21B can be minimized, whereby a difference between the ambient temperature of the first sensor 21A and the ambient temperature of the second sensor 21B can be reduced (eliminated), and the accuracy in fluid flow-rate control of the measured flow rate Qf of the fluid flowing through the main fluid channel 12 can be further enhanced.

Furthermore, with the flow-rate controller 10 according to this embodiment, since the base component 14 positioned between the base component 14 located below the first sensor 21A and the second sensor 21B and the base component 14 located below the control board 66 and the motor 61 serving as a heat source is provided with one or more (seven in this embodiment) slits 14a, heat transmission from the base component 14 located below the control board 66 and the motor 61 serving as a heat source to the base component 14 located below the first sensor 21A and the second sensor 21B can be minimized, whereby a difference between the ambient temperature of the first sensor 21A and the ambient temperature of the second sensor 21B can be reduced (eliminated), and the accuracy in fluid flow-rate control of the measured flow rate Qf of the fluid flowing through the main fluid channel 12 can be further enhanced.

Furthermore, with the flow-rate controller 10 according to this embodiment, since one or more (two in this embodiment) cooling grooves 14b are formed in the upper surface of the base component 14 located below the control board 66 and the motor 61 serving as a heat source and the heat in the body 24 and the base component 14 located below the control board 66 and the motor 61 serving as a heat source is carried away by the air passing through the cooling grooves 14b, heat transmission from the body 24 and the base component 14 located below the control board 66 and the motor 61 serving as a heat source to the body 24 and the base component 14 located below the first sensor 21A and the second sensor 21B can be minimized, whereby a difference between the ambient temperature of the first sensor 21A and the ambient temperature of the second sensor 21B can be reduced (eliminated), and the accuracy in fluid flow-rate control of the measured flow rate Qf of the fluid flowing through the main fluid channel 12 can be further enhanced.

Furthermore, with the flow-rate controller 10 according to this embodiment, since at least one (one in this embodiment) groove 14c is formed in the lower surface of the base component 14 located below the control board 66 and the motor 61 serving as a heat source and at least one (one in this embodiment) groove 14d is formed in the lower surface of the base component 14 located below the first sensor 21A and the second sensor 21B, the heat from an installation surface (not shown) can be prevented from entering the base components 14, whereby a difference between the ambient temperature of the first sensor 21A and the ambient temperature of the second sensor 21B can be reduced (eliminated), and the accuracy in fluid flow-rate control of the measured flow rate Qf of the fluid flowing through the main fluid channel 12 can be further enhanced.

Furthermore, with the flow-rate controller 10 according to this embodiment, since at least one (one in this embodiment) groove 14c is formed in the lower surface of the base component 14 located below the control board 66 and the motor 61 serving as a heat source and the heat in the base component 14 located below the control board 66 and the motor 61 serving as a heat source is carried away by the air passing through the groove 14c, heat transmission from the base component 14 located below the control board 66 and the motor 61 serving as a heat source to the base component 14 located below the first sensor 21A and the second sensor 21B can be minimized, whereby a difference between the ambient temperature of the first sensor 21A and the ambient temperature of the second sensor 21B can be reduced (eliminated), and the accuracy in fluid flow-rate control of the measured flow rate Qf of the fluid flowing through the main fluid channel 12 can be further enhanced.

The present invention is not limited to the above embodiment, and various changes and modifications are permissible so long as they do not depart from the spirit of the invention.

What is claimed is:
1. A differential-pressure flowmeter comprising:
a body having a main fluid channel through which a fluid, whose pressure is to be measured, flows; and
two pressure sensors held by the body and arranged in series relative to the main fluid channel,
wherein a temperature balancer composed of a material with high thermal conductivity is accommodated in a recess that is formed in the body located below the two pressure sensors.

2. A flow-rate controller that controls the degree of opening of a flow-rate control valve by using a measured value of the differential-pressure flowmeter according to claim 1.

3. A flow-rate controller that controls the degree of opening of a flow-rate control valve by using a measured value of the differential-pressure flowmeter according to claim 1,
wherein a first body section located below a motor that vertically moves a valve plug of the flow-rate control valve and a control board that controls the degree of opening of the flow-rate control valve is connected to a second body section located below the two pressure sensors via a constricted section formed so as to have a width smaller than that of the second body section located below the two pressure sensors and a height smaller than that of the second body section located below the two pressure sensors.

4. The flow-rate controller according to claim 3, comprising a base component fixed to the body with fastening members,
wherein a first base component section positioned between a second base component section located below the two pressure sensors and a third base component section located below the motor and the control board is provided with at least one slit that extends therethrough in a thickness direction thereof.

5. The flow-rate controller according to claim 4, wherein at least one cooling groove that allows a front surface and a rear surface to communicate with each other is formed in an upper surface of the third base component section located below the motor and the control board.

6. The flow-rate controller according to claim 4, wherein at least one groove that allows a front surface and a rear surface to communicate with each other is formed in a lower surface of the third base component section located below the motor and the control board.

7. The flow-rate controller according to claim 4, wherein at least one groove that allows a front surface and a rear surface to communicate with each other is formed in a lower surface of the second base component section located below the two pressure sensors.

* * * * *